(12) United States Patent
Hammer

(10) Patent No.: US 8,904,866 B2
(45) Date of Patent: Dec. 9, 2014

(54) MICROGYROSCOPE FOR DETERMINING ROTATIONAL MOTIONS ABOUT AT LEAST ONE OF THREE PERPENDICULAR SPATIAL AXES

(75) Inventor: Hanno Hammer, Graz-Lebring (AT)

(73) Assignee: Maxim Integrated Products, Inc., San Jose, CA (US)

( * ) Notice: Subject to any disclaimer, the term of this patent is extended or adjusted under 35 U.S.C. 154(b) by 387 days.

(21) Appl. No.: 13/319,234

(22) PCT Filed: May 20, 2010

(86) PCT No.: PCT/EP2010/056959
§ 371 (c)(1),
(2), (4) Date: Nov. 7, 2011

(87) PCT Pub. No.: WO2010/136379
PCT Pub. Date: Dec. 2, 2010

(65) Prior Publication Data
US 2012/0055248 A1    Mar. 8, 2012

(30) Foreign Application Priority Data
May 27, 2009   (DE) .......................... 10 2009 026 511

(51) Int. Cl.
*G01C 19/56* (2012.01)
*G01C 19/5755* (2012.01)
*G01C 19/5712* (2012.01)

(52) U.S. Cl.
CPC ........ *G01C 19/5755* (2013.01); *G01C 19/5712* (2013.01)
USPC .................................... 73/504.12; 73/504.04

(58) Field of Classification Search
CPC ............... G01C 19/56; G01C 19/5719; G01C 19/5712; G01C 19/5747; G01C 19/5635; G01C 19/5663; G01C 19/5642; G01C 19/5607; G01C 19/5649
USPC ........ 73/504.12, 504.14, 504.02, 504.04, 511
See application file for complete search history.

(56) References Cited

U.S. PATENT DOCUMENTS 6,837,107 B2 *  1/2005  Geen .......................... 73/504.04
(Continued)

FOREIGN PATENT DOCUMENTS

CN          101027536 A       8/2007
(Continued)

OTHER PUBLICATIONS

English translation of Written Opinion of Aug. 20, 2010, from priority International Application No. PCT/EP2010/056959, filed May 20, 2010.
(Continued)

*Primary Examiner* — Helen Kwok
(74) *Attorney, Agent, or Firm* — North Weber & Baugh LLP

(57) ABSTRACT

A microgyroscope is used to determine rotational motions about at least one of three perpendicular spatial axes x, y, and z. The microgyroscope has a substrate (1) on which multiple masses (2x, 2y, 9) which oscillate parallel to the plane of the substrate (1) in an x-y plane are situated. Some of the oscillating masses (2x, 2y) are attached to the substrate (1) by means of springs and anchorings. Drive elements (4a, 4b) are used to maintain oscillating vibrations of the masses (2x, 2y, 9) which are subjected to Coriolis forces when the substrate (1) rotates about any given spatial axis. Sensor elements detect the deflections of the masses (2x, 2y, 9) due to the Coriolis forces generated. Some of the oscillating masses are x masses (2x) which are also deflectable along the z axis perpendicular to the substrate (1), by means of which they are able to detect yaw rates about the x axis, and/or some of the oscillating masses are y masses (2y) which are also deflectable along the z axis perpendicular to the substrate (1), by means of which they are able to detect yaw rates about the y axis, and/or others of the oscillating masses are z masses (9) which are also deflectable in the x-y plane, but perpendicular to their respective drive direction, by means of which they are able to detect yaw rates about the z axis.

28 Claims, 11 Drawing Sheets

(56) References Cited

U.S. PATENT DOCUMENTS

| | | | | |
|---|---|---|---|---|
| 6,859,751 | B2 * | 2/2005 | Cardarelli | 702/141 |
| 7,168,317 | B2 * | 1/2007 | Chen et al. | 73/504.04 |
| 7,284,429 | B2 * | 10/2007 | Chaumet et al. | 73/504.12 |
| 8,261,614 | B2 * | 9/2012 | Hartmann et al. | 73/504.12 |
| 2010/0139399 | A1 * | 6/2010 | Geiger et al. | 73/504.12 |
| 2012/0024056 | A1 * | 2/2012 | Hammer | 73/504.02 |
| 2012/0060604 | A1 * | 3/2012 | Neul et al. | 73/504.12 |

FOREIGN PATENT DOCUMENTS

| | | |
|---|---|---|
| CN | 101319899 A | 10/2008 |
| CN | 101324434 A1 | 12/2008 |
| DE | 19500800 A1 | 12/1995 |
| DE | 102007012163 A1 | 10/2007 |
| DE | 102007030120 A1 | 1/2009 |
| DE | 102007054505 A1 | 5/2009 |
| EP | 1832841 A1 | 9/2007 |
| WO | 2006034706 A1 | 4/2006 |

OTHER PUBLICATIONS

English translation of International Preliminary Report on Patentabiliity of Dec. 16, 2011, from priority International Application No. PCT/EP2010/056959, filed May 20, 2010.

International Search Report for Co-Pending PCT Application No. PCT/EP2010/056959, 2010.

Office Action issued Jan. 24, 2014, in related Chinese Patent Application No. 201080023084.0.

* cited by examiner

MICROGYROSCOPE FOR DETERMINING ROTATIONAL MOTIONS ABOUT AT LEAST ONE OF THREE PERPENDICULAR SPATIAL AXES

CROSS REFERENCE TO RELATED PATENT APPLICATIONS

This application is the National Phase Application under 35 USC §371 of International Application No. PCT/EP2010/056959, filed May 20, 2010, which claims priority to German Patent Application No. 10 2009 026 511.2, filed May 27, 2009.

BACKGROUND

A. Technical Field

The present invention relates to a microgyroscope for determining rotational motions about at least one of three perpendicular spatial axes x, y, and/or z, having a substrate on which multiple masses which oscillate parallel to the plane of the substrate in an x-y plane are situated, some of the oscillating masses being attached to the substrate by means of springs and anchorings, having drive elements for maintaining oscillating vibrations of the masses which are subjected to Coriolis forces when the substrate rotates about any given spatial axis, and having sensor elements for detecting the deflections of the masses due to the Coriolis forces generated. Microgyroscopes are generally used for determining a rotational motion about an axis in an orthogonal x-y-z coordinate system. Therefore, three such microgyroscopes are necessary to be able to determine rotational motions of the system about each of the three axes. This entails high expense, and complicated control and evaluation of the data.

B. Background of the Invention

A triaxial microelectromechanical (MEMS) gyroscope is known from TW 286201 BB. Masses which are situated on a central anchoring are set in oscillating rotational motion. The masses are arranged on a substrate, and when there is a torque about the x or y axis the masses are tilted about the y or x axis, respectively, due to a Coriolis force which occurs. This is made possible by an appropriate suspension of these drive masses on the substrate. When there is a torque about the z axis, partial masses are translationally deflectable by an appropriate suspension of these partial masses on the rotatably supported masses. The tilting motions as well as the translational motion may be detected by sensors, and due to their proportionality to the rotational motion of the substrate, are used as a measure of the corresponding rotation about the x, y, or z axis. However, the respective deflections are very difficult to determine.

To allow a three-dimensional gyroscope to be provided for which rotations about all three axes may be determined, in the 1996 article titled "A monolithic silicon gyroscope capable of sensing about three axes simultaneously," D. Wood et al. proposed a gyroscope having oscillating masses annularly arranged around a central anchoring. These masses are able to undergo tilting motions as well as rotational motions as the result of Coriolis forces which occur. It is disadvantageous that it is difficult to manufacture such a sensor and to drive the moved masses. The motions of the individual components of the sensor have a mutual influence on one another, so that measurements of the motion in the x, y, or z direction of the gyroscope do not provide sufficient accuracy.

One-dimensional and two-dimensional gyroscopes are also basically known which are able to detect tilting and rotational motions of the gyroscope only about one or about two of the three spatial axes x, y, and z. Fairly simple gyroscopes of this type are adequate for many applications.

SUMMARY OF THE INVENTION

The object of the present invention is to provide microgyroscopes which are compact and which have a relatively simple design, and which have high detection accuracy with regard to one, two, or three yaw rates about the x, y, and/or z axis.

The present object is achieved by a microgyroscope having the features of claim 1.

The microgyroscope according to the invention is a microelectromechanical system (MEMS), and is used for determining rotational motions about at least one, and in one preferred embodiment of the invention, about two or three, of three perpendicular spatial axes x, y, and z. Multiple masses which oscillate parallel to the plane of the substrate in an x-y plane are situated on a silicone [sic; silicon] substrate. At least some of these oscillating masses are attached to the substrate by means of springs and anchorings. Drive elements are used for maintaining linearly oscillating vibrations of these masses. When the substrate rotates about a predetermined spatial axis, Coriolis forces result which cause the associated masses to be deflected in a defined direction. These deflections may be detected using sensor elements.

If x or y yaw rates are to be detected, in addition to the drive direction extending parallel to the substrate, some of the oscillating masses may be deflected along the z axis perpendicular to the substrate. The masses which are also deflectable along the z axis and which are designed for detecting yaw rates about the x axis are referred to below as "x masses"; similarly, the masses which are deflectable along the z axis and which are designed for detecting rotations of the substrate about the y axis are referred to as "y masses." In turn, others of the oscillating masses are z masses, which in addition to their drive direction in the x-y plane are deflectable perpendicular to their respective drive direction, but within the x-y plane parallel to the substrate, in order to detect a rotation of the gyroscope about the z axis.

Accordingly, if a yaw rate is present about the x axis, Coriolis force pairs act on the x masses, resulting in oscillating deflection of the x masses in phase opposition along the z axis. Yaw rates about the y axis are detected in an analogous manner, resulting in an oscillating deflection of the y masses in phase opposition along the z axis. If a yaw rate is present about the z axis, forces which are directed radially inwardly or outwardly act on the z masses. The z masses are thus forced into a corresponding radial oscillating motion. This motion, the same as the motion of the x masses and the y masses, may be detected using sensor elements. Depending on the design of the gyroscope, all of the referenced directions of motion, or only single directions of motion, are made possible. For a design as a three-dimensional gyroscope for detecting yaw rates about all three axes, the movability of the x masses in the y direction as the primary motion and in the z direction as the secondary motion, of the y masses in the x direction as the primary motion and in the z direction as the secondary motion, and of the z masses in the x and/or y direction as the primary motion and correspondingly in the y and/or x direction as the secondary motion, are made possible by a suitable suspension of the x, y, and z masses.

On the other hand, if the gyroscope is provided strictly as a z gyroscope, the secondary movability of the x masses and y masses is suppressed. The x masses and the y masses are suspended on the substrate in such a way that only their primary motion is permitted. Only the z masses have a primary motion in the x and/or y direction and a corresponding secondary motion in the y and/or x direction in order to indicate a z yaw rate.

In another embodiment of the invention, if the gyroscope is designed as a two-dimensional gyroscope which is to detect only yaw rates about the x axis and the y axis, the gyroscope either has no z masses, or the independent movability of the z masses in the x or y direction is blocked or is not evaluated.

Further options for alternative gyroscopes according to the invention result in each case by dispensing with the corresponding mass or the movability thereof in the direction which is not required. Thus, in addition to strictly z gyroscopes, strictly x or strictly y gyroscopes or x-y, x-z, or y-z gyroscopes may be implemented which have the basic design of the present invention.

When appropriately excited, the sensor elements generate an electrical signal which is proportional to the x, y, or z yaw rate of the gyroscope. The sensor elements may be plate capacitors, for example, which are situated on the substrate and the x or y or z masses, and which generate the electrical signal when the distance between them changes. In principle, vertical or horizontal capacitors or electrodes are possible as sensor elements. It is important that the change in position of the individual elements relative to one another is detectable. This is generally achieved in that a portion of the plate capacitors or capacitor electrodes are stationarily situated on the substrate, while the portion corresponding thereto is attached to the movable x, y, or z masses.

According to the invention, a central anchoring is situated on the substrate. The masses are arranged around the central anchoring, the x masses and the y masses being connected to the central anchoring, and the z masses being connected to the x masses or to the y masses. The x masses and the y masses are supported on the substrate in such a way that they are linearly and tangentially drivable about the central anchoring. When four x or y masses are used, two of the masses are drivable in the x direction as the primary motion, and the other two masses are drivable in the y direction. The direction of motion preferably extends linearly and parallel to the x or y axis; the relative phase of the individual components is such that the moving elements as a whole undergo a linear and tangential motion about the z axis.

As the result of arranging the masses around the central anchoring and connecting the masses to the central anchoring, a supporting and coupling function is achieved which makes the system much more stable against interfering effects than is the case for the prior art. On the one hand, as the result of the linear drive motion which is tangentially directed with respect to the central anchoring, an uncomplicated drive mode is provided which allows very uniform oscillation of the masses. On the other hand, the masses are supported on the central anchoring, and when appropriately coupled, also mutually influence one another in such a way that they may be driven very uniformly and without significant deviations from one another, not only individually, but also in relation to the other masses. This allows a sensor to be provided which operates very precisely. In addition, the supporting action of the central anchoring has an effect on the masses in such a way that parasitic influences, such as impacts to the sensor, do not result in measuring errors. Without the supporting action, impacts could result in an inadvertent "butterfly mode" in which the masses, similar to the beating of the wings of a butterfly, are moved out of the x-y plane, possibly even resulting in destruction of the sensor.

The design according to the invention of the oscillating masses and their primary and secondary motions allow a relatively simple structure of the microgyroscope. In particular, the secondary motions are completely unambiguous, so that the secondary motions of the masses may be uniquely associated with an x, y, or z yaw rate by the sensor elements associated with the secondary motions. The electrical signals of the sensor elements may thus be evaluated reliably and with great accuracy.

In one preferred embodiment of the invention, the x masses and/or the y masses are designed as sensor plates. The sensor plates have a flat extension in the x-y plane parallel to the substrate, and have a relatively large mass. The sensor plates are deflected in the z direction when an x yaw rate or a y yaw rate is present. In one preferred embodiment, the sensor plates remain essentially parallel to the x-y plane during the deflection. Only the distance from the plane of the substrate changes during the deflection in the z direction.

In one advantageous embodiment of the invention, the z masses are designed as frames. The z masses are moved, together with the x masses or the y masses, in the respective primary direction of motion of the x or y mass on which they are situated. When a z yaw rate occurs, the z masses are deflected in the x-y plane, perpendicular to the respective drive direction. As a result of the frame-like design of the z mass, the arrangement of sensor elements which define the deflection perpendicular to their primary drive direction is relatively simple. The stationary sensor elements are situated inside the frame. The change in distance of the frame from the stationary elements may be easily determined. If the gyroscope is designed as a two-dimensional gyroscope which is to detect only yaw rates in the x and y directions, the z masses may be dispensed with; i.e., the gyroscope has no z masses.

To obtain a compact design of the microgyroscope, it is advantageous when the x, y, and/or z masses have an essentially rectangular layout. These masses may thus be arranged on the substrate, offset relative to one another in the x-y plane, in such a way that on the one hand they have sufficient freedom of motion for the primary and secondary motions, and on the other hand occupy a small overall area. The unused free space inside the microgyroscope may thus be kept very small. The microgyroscope as a whole is thus very compact.

To obtain stable mounting of the x masses and y masses, fixing anchors and drive springs are provided on the substrate. The x masses and y masses are fastened to the fixing anchor via the drive springs. The x masses and y masses are thus situated at a predetermined distance from the substrate in the x-y plane. The primary motion of the x masses occurs in phase opposition in the y direction. The secondary motion occurs in phase opposition in the z direction, by means of which an x yaw rate is detected. The drive springs of the x masses are therefore preferably designed in such a way that they have a controllable stiffness or flexibility in the y direction and in the z direction, but are barely flexible in the x direction. The resistance of the drive springs to a deflection of the x masses in the primary and secondary directions may be set as desired.

Similarly, the drive springs of the y masses are designed in such a way that they have a controllable stiffness or flexibility in the x and z directions, but are barely flexible in the y direction. The gyroscope is able to detect y yaw rates in this way. The primary direction of motion of the y masses occurs in phase opposition in the x direction, and the secondary motion of the y masses occurs in phase opposition in the z direction. For the drive as well as for the yaw rate detection, the drive springs for the y masses thus have a relatively soft design and offer little resistance. On the other hand, in the y direction the position of the y masses should be relatively unchangeable. Therefore, the drive springs in this direction have a stiff design.

If the microgyroscope is to be designed strictly as a z gyroscope, for example, it is advantageous when the x masses and y masses have no secondary movability. The drive springs for the x masses are then designed in such a way that they have controllable flexibility in the y direction, and are barely flexible in the z and x directions. Thus, the gyroscope is not able to detect x yaw rates. In order to not detect y yaw rates as well, it is advantageous when the drive springs for the y masses are designed in such a way that they have controllable flexibility in the x direction, and are barely flexible in the y and z directions.

To obtain a stable support of the x masses and y masses on the substrate, it is preferably provided that the x masses and y masses are each retained by an outer drive spring and an inner drive spring. The outer drive spring faces the edge of the microgyroscope, while the inner drive spring faces the adjacent mass. The resonance frequencies of the drive modes and the x or y yaw rate detection modes may be set by virtue of the shape and width of the drive springs.

If the gyroscope is to detect x or y yaw rates, it is advantageous when the outer drive springs and the inner drive springs are situated on the x or y mass with controllable flexibility in the z direction. The deflection of the x or y mass in the z direction as a secondary motion is assisted in this way.

If only z yaw rates are to be detected by the gyroscope, it is advantageous when the outer drive springs and inner drive springs are situated on the x or y mass so as to be barely flexible in the z direction. As a result of the stiff arrangement, the x masses and y masses largely remain in the x-y plane and are not deflected.

In one advantageous embodiment of the invention, when the outer drive spring and the inner drive spring have different lengths, this may be advantageous in order to compensate for inclined tilting axes in the detection of the x yaw rates or the y yaw rates. In this manner, the x or y masses which are deflected along the z axis in the course of the detection of an x or y yaw rate remain oriented essentially parallel to the x-y plane, and thus, parallel to the substrate.

The x masses and y masses are preferably driven by means of comb electrodes. One part of the comb electrodes is stationarily attached to the substrate, while the other corresponding part of the comb electrodes is attached to the x masses and the y masses. The x masses and the y masses are attracted in alternation by applying an alternating voltage, thus producing the oscillating primary motion.

In one advantageous embodiment of the invention, the x masses are oriented and driven in the y direction, and the y masses are oriented and driven in the x direction. In particular for a rectangular layout of the x masses and the y masses, a practically square overall layout of the microgyroscope may be obtained by a 90° rotation of the y masses and a correspondingly offset mounting. This results in a very compact, small design of the microgyroscope.

When two x masses and two y masses are arranged in alternation around the central anchoring, this also results in a desirable equilibrium during the drive and detection of x or y yaw rates, in the following sense: parasitic torques which could result around the anchoring during a nonuniform deflection or a nonuniform drive of the x or y masses are thus largely neutralized. The microgyroscope is thus balanced, and the corresponding yaw rates may be determined free of interfering effects.

If the x masses and the y masses are each situated on a central spring by means of a coupling spring, there is a shared, synchronous mode of vibration of these masses in the sense of the drive motion around the central anchoring. This is the case in particular when the central spring is attached to the central anchoring and is designed to rotate around same in the x-y plane. As a result of the coupling springs, all four x or y masses may be driven synchronously and may have the same resonance frequency. This is advantageous for accurate and consistent detection of yaw rates which occur.

The central spring influences the drive resonance frequency, but generally only negligibly. The central spring primarily prevents external shock pulses, which are introduced to the sensor structure along the z axis, from easily striking the x or y masses on the substrate. The secondary task of the central spring is to synchronize the drive motions of the x or y masses via the coupling springs in such a way that the x or y masses as a whole achieve a single, shared resonance frequency at the desired drive frequency.

In one particularly advantageous embodiment, the coupling springs have an overall spiral design. A coupling spring is preferably stiff in a tangential direction in order to transmit coupling forces in this direction. However, in the radial direction the coupling spring has a soft design in order to avoid distortion forces on the x or y mass. This advantageously ensures that while being driven, the x or y mass, similarly as for the secondary motion for detecting a yaw rate, is largely free of resistance but may still be synchronously moved. If the resistances due to the coupling springs were too large, there would be concern that the x or y masses might warp, which would adversely affect the detection of yaw rates about the z axis.

In one particularly preferred embodiment of the invention, a z mass is situated on each x mass and each y mass. Thus, each x mass and each y mass has a z mass. The primary motion of the z mass, together with the x mass or the y mass, occurs in the y or x direction, respectively. Due to the occurrence of z rotation of the microgyroscope, the z masses are deflected perpendicular to the direction of their primary motion, and parallel to the substrate. If the primary motion of the z mass is in the x direction, the z mass is deflected in the y direction. If the z mass is situated on an x mass whose primary motion occurs in the y direction, the Coriolis force, which refers to a z yaw rate, deflects the z mass in the x direction. Due to the drive vibration mode of the x or y masses which is synchronized by the coupling springs, and which occurs in a spiral rotational manner about the z axis, the phases of the deflections of the z masses during detection of a rotation of the gyroscope are synchronized about the z axis in such a way that they oscillate together in the x-y plane, and radially inwardly and outwardly with respect to the z axis.

To obtain appropriate elasticity for the deflection of the z masses in the secondary motion which is relevant for detecting a z yaw rate, but to still firmly connect the z mass to the x or y mass in the primary direction, springs are provided, which via a connecting bar projection are essentially centrally connected to the x or y mass. This prevents the springs from resting directly on the x mass or the y mass, which is advantageous for decoupling the z yaw rate detection from the primary motion. Such an attachment of the z mass to the x or y mass is also advantageous when the microgyroscope has a different design than that claimed herein.

It is particularly advantageous when the connection of the bar projection to the x or y mass and to the fixing anchors of the x or y mass are in flush alignment with one another. Warping, which could occur due to deformations of the x or y mass, is thus kept to a particularly low level.

The secondary motion of the z masses is specified according to the invention by the fact that the springs which are associated with the x mass have controllable flexibility in the x direction, i.e., are controllably soft, and are barely flexible in the y and z directions, i.e., have an essentially stiff design.

Accordingly, it is also advantageous when the springs which are associated with the y mass have controllable flexibility or softness in the y direction, and in the x and z directions are barely flexible, i.e., have an essentially stiff design. As a result, the z mass together with the x mass and the y mass is synchronously moved in the primary direction, and optionally when the x or y mass is also deflected, is moved together with the x or y mass in its secondary direction. On the other hand, when a z yaw rate occurs, the z mass ceases its shared motion with the x or y mass, and yields in the x or y direction, depending on the direction in which the primary motion occurred.

If a gyroscope according to the invention is designed as a z gyroscope in order to detect only z yaw rates, the drive springs of the x masses are preferably designed in such a way that they have controllable flexibility in the y direction, and are barely flexible in the z and x directions. The drive springs of the y masses are designed in such a way that they have controllable flexibility in the x direction, and are barely flexible in the y and z directions. The connecting springs associated with the x masses have controllable flexibility in the x direction and are barely flexible in the y and z directions, and the connecting springs associated with the y masses have controllable flexibility in the y direction and are barely flexible in the x and z directions. As a result, the x masses and the y masses are not able to deflect in response to the Coriolis force which occurs due to yaw rates about the x or y axis, since they are supported relatively rigidly with respect to forces in the respective direction. Only the z mass is deflected and is able to respond to a z yaw rate of the gyroscope via a secondary motion in the x or y direction within the x-y plane. The sensor elements associated with the z mass detect this deflection.

If the gyroscope is designed as a three-dimensional gyroscope in order to detect yaw rates about the x, y, and z axes, the drive springs of the x masses are designed in such a way that they have controllable flexibility in the y and z directions, but are barely flexible in the x direction. The drive springs of the y masses are designed in such a way that they have controllable flexibility in the x and z directions, and are barely flexible in the y direction. The connecting springs associated with the x masses have controllable flexibility in the x direction, and are barely flexible in the y and z directions. The connecting springs associated with the y masses have controllable flexibility in the y direction, and are barely flexible in the x and z directions. All of the x, y, and z masses may thus be moved in their secondary directions as the result of a Coriolis force which occurs. The motions are detected by associated sensor elements.

If a gyroscope according to the invention is designed as a two-dimensional gyroscope in order to detect yaw rates about the x axis and the y axis, the movabilities of the x masses and the y masses are provided in the same way as for the three-dimensional gyroscope. In contrast, either the movability of the z mass in the x-y plane is blocked transverse to the primary motion, or the z masses are completely dispensed with in the corresponding gyroscope. The gyroscope thus has a simpler design, since the z masses as well as the associated springs are not necessary.

One particularly advantageous design of a three-dimensional gyroscope according to the invention is described below:

The x or y masses are set in drive motion mode by means of the drive combs. The x and y masses oscillate synchronously in the drive combs at the frequency of the drive voltage, in a tangential direction with respect to the circle described by the coupling springs. In the absence of the coupling springs, it would be possible for all four x or y masses to move independently of one another. Although excitation is provided by the same drive voltage, as a result of unavoidable production tolerances in the springs the drive resonance frequencies of the four masses would be slightly different from one another, which would necessarily result in different excitation amplitudes and slightly shifted phases of the drive motion. Due to the presence of the coupling springs, a single, shared drive resonance frequency is achieved in which all masses oscillate in phase and at the same amplitude.

If a yaw rate $\Omega$ is present about the x axis, Coriolis forces which are proportional to the cross product v x $\Omega$, where v represents the speed of the particular mass, act on the x masses. These forces result in deflections, oscillating in phase opposition, of the plates which form the x masses, along the z axis. The plates, together with conductive surfaces located therebeneath which stationarily rest on the silicon substrate, form plate capacitors, by means of which the detection motion is converted to an electrical signal.

Yaw rates about the y axis are detected in a similar manner, resulting in deflection, oscillating in phase opposition, of the plates which form the y masses.

If a yaw rate is present about the z axis, forces which are directed radially inwardly/outwardly act on the z masses. The frames are then forced into the motion form of the z detection mode. The vertical surfaces of the recesses in the z masses form the moving halves of plate capacitors, whose stationary halves are located within the recesses.

In the absence of central springs, the gyroscope would have parasitic natural oscillations in which the plates, connected by the coupling springs, synchronously move up and down along the z axis. It would thus be difficult to prevent the sensor structure from striking the substrate under the effect of an impact along the z axis. The presence of the central springs completely eliminates this natural oscillation mode.

As a result of the spiral shape of the coupling springs, coupling forces are transmitted essentially only in a tangential direction with respect to the central, circular coupling spring. In particular, these springs are extremely soft in the radial direction. Together with the fact that their starting point is located at the inner drive spring, distortion forces which would act radially inwardly on the plates in the drive motion are thus largely avoided. Otherwise, such distortions could subsequently be transmitted to the springs which retain the z mass inside the x or y masses, thus adversely affecting the signal for detecting z yaw rates.

The springs which connect the z masses to the x or y masses rest on a bar which centrally establishes the connection to the x or y masses. This measure provides further protection of the connecting springs from buckling, and from the associated interferences in the detection of z yaw rates.

One particularly advantageous design of a two-dimensional gyroscope for detecting yaw rates about the x and y axes according to the invention is described below:

The sensor plates, i.e., the x masses and the y masses, are set in drive motion mode by the drive combs. The sensor plates oscillate in these drive combs at the frequency of the drive voltage in a tangential direction with respect to the circle described by the coupling springs. In the absence of coupling springs, it would be possible for all four plates to move independently of one another. Although excitation is provided by the same drive voltage, as a result of unavoidable production tolerances in the springs the drive resonance frequencies of the four plates would be slightly different from one another, which would necessarily result in different excitation amplitudes and slightly shifted phases of the drive motion. Due to the presence of the coupling springs, a single, shared drive resonance frequency is achieved in which all plates oscillate in phase and at the same amplitude. If a yaw rate Ω is present about the x axis, Coriolis forces which are proportional to the cross product v x Ω, where v represents the speed of the particular plate, act on the plates. These forces result in deflection, oscillating in phase opposition, of the upper left plate and the lower right plate along the z axis. The plates, together with conductive surfaces located therebeneath which stationarily rest on the silicon substrate, form plate capacitors, by means of which the detection motion is converted to an electrical signal.

Yaw rates about the y axis are detected in a similar manner, resulting in deflection, oscillating in phase opposition, of the lower left plate and the upper right plate.

In the absence of the advantageous central springs, the resonance of the "butterfly" mode, in which the plates, connected by the coupling springs, move up and down along the z axis would be at very low frequencies, approximately 5 kHz. It would thus be difficult to prevent the sensor structure from striking the substrate under the effect of an impact along the z axis. The presence of the central springs completely eliminates this mode. As a result of the spiral shape of the coupling springs, coupling forces are transmitted essentially only in a tangential direction with respect to the central, circular coupling spring. In particular, these springs are extremely soft in the radial direction.

BRIEF DESCRIPTION OF THE DRAWINGS

Further advantages of the present invention are described in the following exemplary embodiments.

DETAILED DESCRIPTION OF THE PREFERRED EMBODIMENTS

Figure 1:
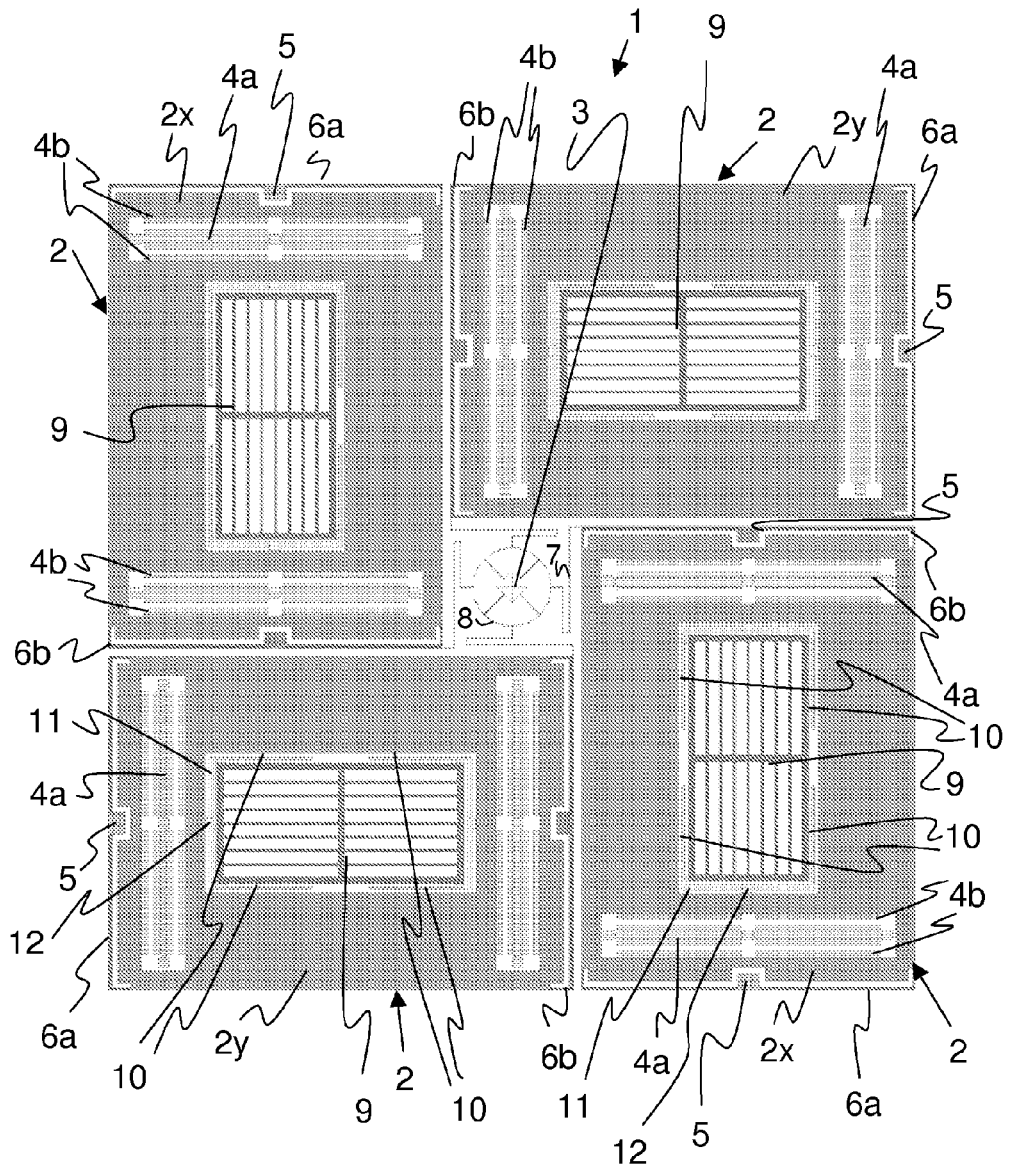
FIG. 1 shows a top view of a three-dimensional microgyroscope according to the invention.

FIG. 1 shows a top view of a three-dimensional microgyroscope according to the invention. Important components are linearly oscillating sensor plates 2, which in each case have an essentially rectangular layout and are arranged around a central anchoring 3. The sensor plates 2x represent the x masses, while the sensor plates 2y form the y masses. The x masses 2x extend lengthwise in the y direction, while the y masses 2y have a longer extension in the x direction. The x masses 2x as well as the y masses 2y are situated in the x-y plane above a substrate, not illustrated.

The x masses 2x and the y masses 2y are driven in a linearly oscillating manner in the y or x direction, respectively, by means of comb electrodes. The comb electrodes are each composed of two stationary comb sections 4a which are situated on the substrate, and movable comb sections 4b which are connected to the sensor plate 2. The electrodes are attracted in alternation by applying an alternating voltage, causing the sensor plates 2 to move back and forth in an oscillating manner.

To be movably supported in the respective direction, each sensor plate 2 is attached to two fixing anchors 5 by means of drive springs 6a and 6b. Outer drive springs 6a and inner drive springs 6b are provided. In each case the outer drive springs 6a are situated at the outer periphery of the structure, while the inner drive springs 6b are situated facing the adjacent sensor plate 2. The outer drive spring 6a and the inner drive spring 6b may have different designs. This may be advantageous for some designs of the gyroscope according to the invention in order to allow control of the position of the tilting axes of the x masses 2x in the x yaw rate detection motion and of the y masses 2y in the y yaw rate detection motion (see FIGS. 3 and 4). If it is ensured by the design of the gyroscope that the sensor plates 2 may be driven within the x-y plane and at the same time deflected in the z direction, it is not necessary for the inner and the outer drive springs 6a, 6b to have different designs. In the advantageous embodiment of the invention illustrated, the fixing anchor 5 is situated approximately in the middle between the outer and the inner drive springs 6a, 6b.

The x masses 2x and the y masses 2y are point symmetrical with respect to the central anchoring 3. The x masses 2x have a design that is comparable to the y masses 2y. However, the x masses and y masses are arranged on the substrate in a 90° rotation relative to one another. To ensure synchronous vibration of the sensor plates 2, the sensor plates are connected to one another in each case via a coupling spring 7 and a circular central spring 8 which is attached via spokes to the central anchoring 3. The coupling springs 7 have a stiff design in the drive direction of their associated sensor plate 2, but have a soft design in the radial direction with respect to the z axis. As a result of the coupling to the central spring 8, during the primary motion all four sensor plates 2 are driven at the same frequency and are able to vibrate. The dynamic behavior of the gyroscope is significantly improved in this manner.

z masses 9 are situated within the sensor plates 2. The z masses 9 are designed as grid frames. The grid rods may be used as movable electrodes of plate capacitors whose stationary counterparts are stationarily mounted on the substrate, so that when a yaw rate is present about the z axis the secondary motion may be detected by means of an appropriate electrical signal.

The z mass 9 is attached to a bar 11 by means of four connecting springs 10. The bar 11 is centrally situated via a connection 12 to the sensor plate 2. The z mass 9 is retained by the connecting springs 10, which are stiff in the z direction and in the drive direction of the respective sensor plate 2, while they are soft at right angles to the drive direction of the respective sensor plate 2 within the x-y plane. Under the effect of the Coriolis forces which occur when a yaw rate is present about the z axis, the z mass 9 is thus able to yield at right angles to the drive direction, but within the x-y plane. This secondary motion may be detected using the plate capacitors.

Typical motions of the individual components of the gyroscope are illustrated in the following figures. The illustrations are greatly exaggerated to aid in identification of features. Of course, the actual deflections are much smaller. For better clarity, reference numerals, which are representative of identical components by way of example, are not shown in every figure.

Figure 2:
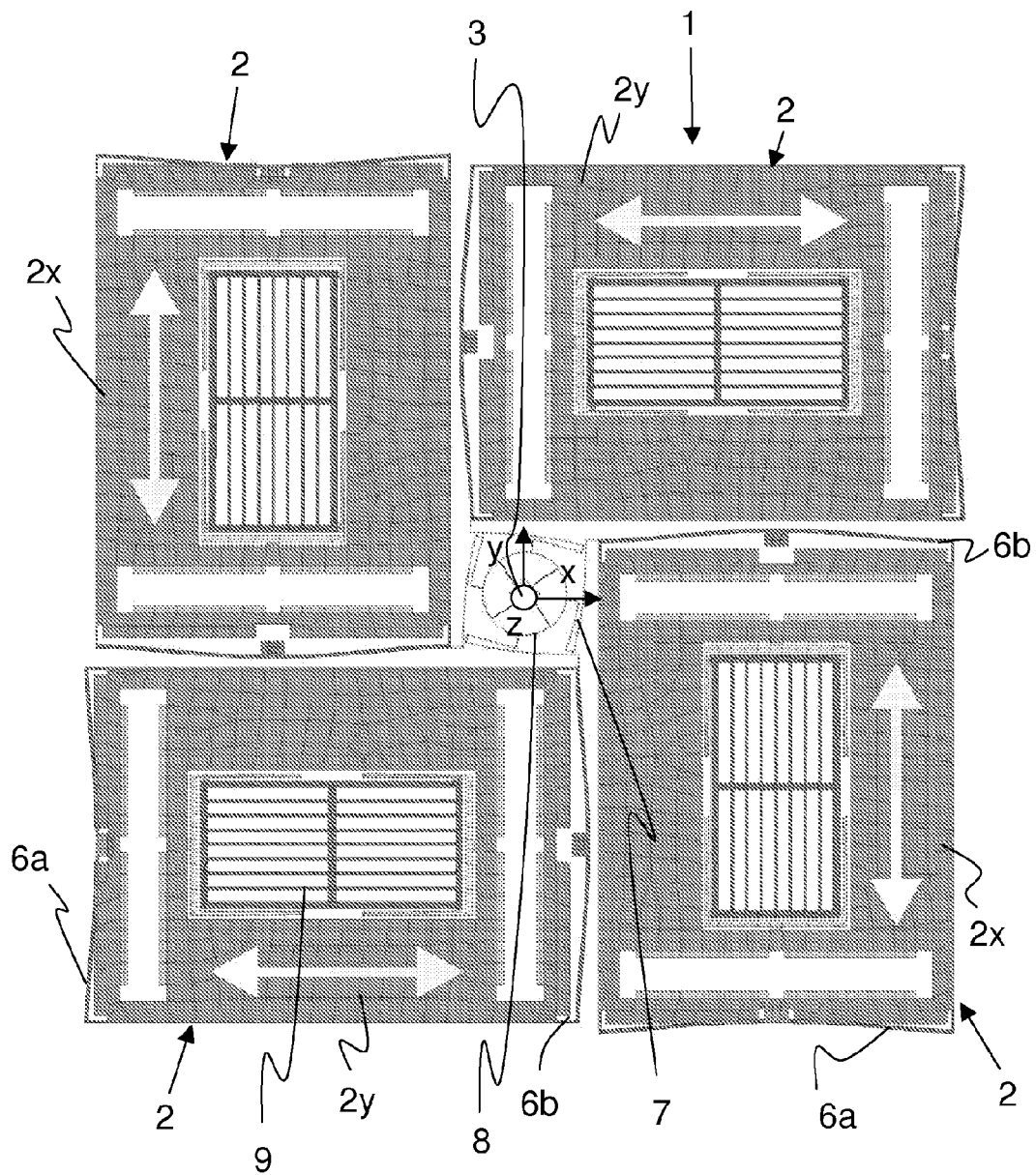
FIG. 2 shows the primary motion of the microgyroscope according to FIG. 1.

FIG. 2 illustrates the drive motions of the sensor plates 2. The x masses 2x move in a linearly oscillating manner, parallel to the y axis and point symmetrically with respect to the central anchoring 3. The y masses 2y are arranged in a 90° rotation relative to the x masses 2x. The directions of motion of the y masses are parallel to the x axis, and are likewise point symmetrical with respect to the central anchoring 3. The inner and the outer anchoring springs 6a, 6b are designed in such a way that they permit this drive motion without great resistance. Thus, the drive springs 6a and 6b for the x masses 2x are soft in the y direction, while they are stiff in the x direction. Similarly, the inner and the outer drive springs 6a, 6b of the y masses 2y are soft in the x direction, and are stiff in the y direction. This ensures that the drive motions of the sensor plates 2 are linear. To synchronize the drive motions of all four sensor plates 2, the sensor plates are connected to one another via coupling springs 7 and a central spring 8 which is attached to the central anchoring 3. As a result of the coupling springs 7, the four sensor plates 2 have the same natural oscillation frequency with respect to the drive motion. The coupling springs 7 are attached to the inner drive springs 6b, thus largely preventing deformation of the sensor plates 2. The central spring 8 together with its spokes is moved in a rotating oscillating manner about the central anchoring 3 due to the drive motions of the sensor plates 2. In addition to the synchronization of the sensor plates 2, the coupling springs 7 and the central spring 8 ensure stable support of the sensor plates 2 on the substrate.

Figure 3:
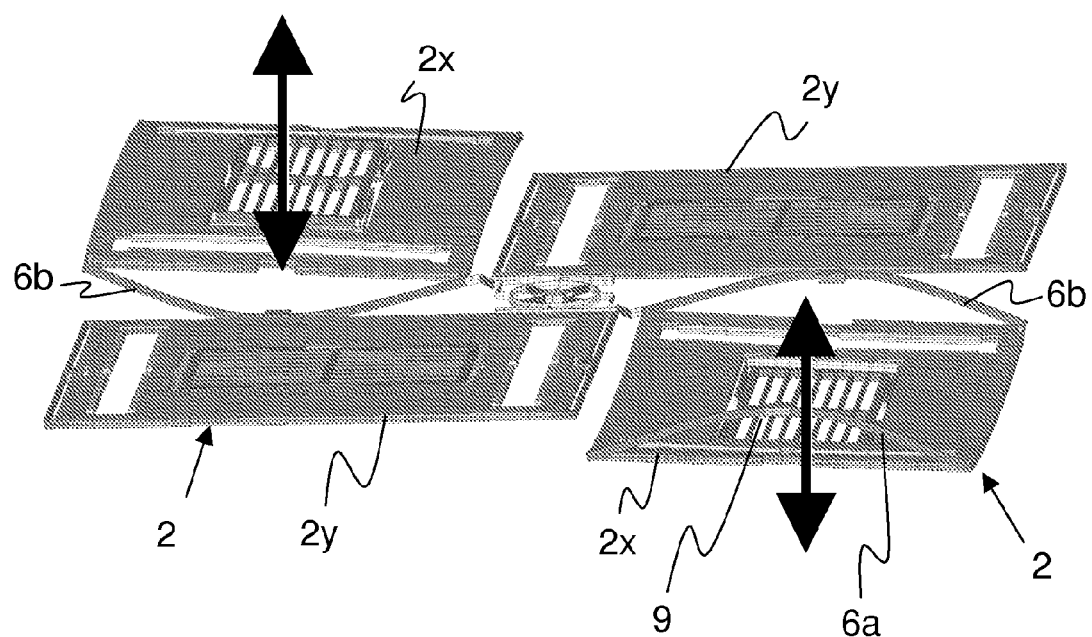
FIG. 3 shows the detection of an x yaw rate of the gyroscope according to FIG. 1.

FIG. 3 shows a perspective illustration of the deflection of the x masses 2x for detecting a rotational motion of the gyroscope about the x axis. The x masses 2x are deflected in the z direction as a response to Coriolis forces which occur at right angles to the primary direction of motion and to the rotational axis. For this purpose, the outer and the inner drive springs 6a and 6b are designed to be relatively soft in the z direction, so that they yield under the effect of a corresponding Coriolis force pair which acts on the x masses 2x, and the x masses 2x are moved in opposite directions in the z direction, out of the x-y plane. The secondary motion of the x mass 2x may be detected using capacitor plates, which are formed by the top side of the substrate and the bottom side of the x masses 2x. The secondary motion causes the distance between the capacitor plates to change, thus generating an electrical signal which indicates the x yaw rate of the gyroscope. The y masses 2y remain in the x-y plane when there is an x yaw rate of the gyroscope, since a yaw rate about the x axis does not generate Coriolis forces for a primary motion in the x direction.

Figure 4:
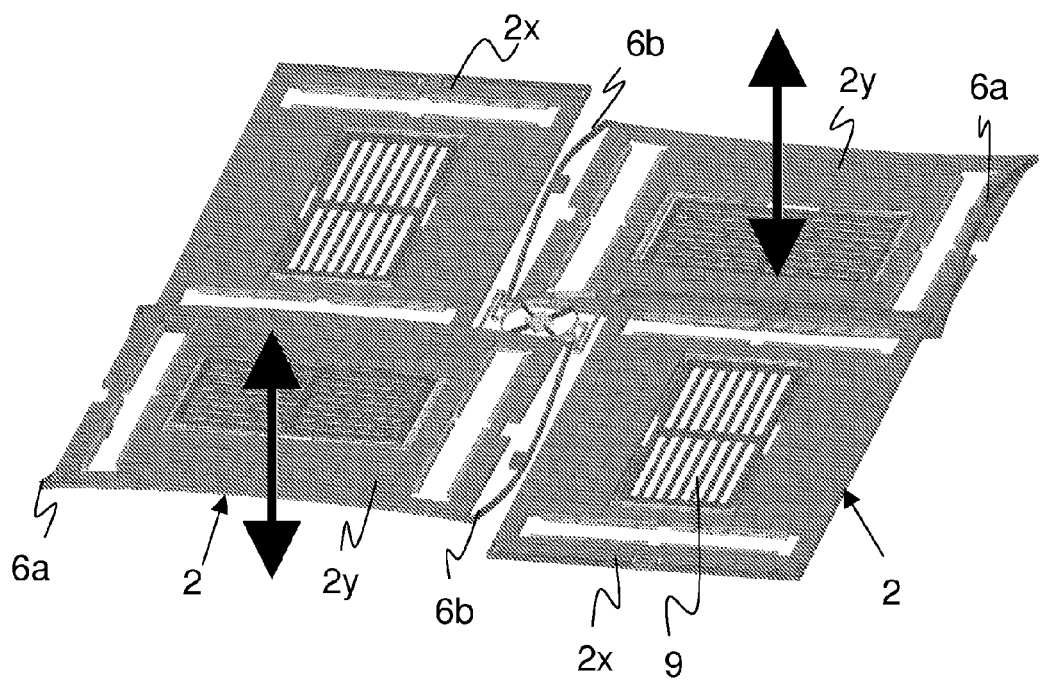
FIG. 4 shows the detection of a y yaw rate of the gyroscope according to FIG. 1.

FIG. 4 shows a perspective illustration of the deflection of the y masses 2y when a y yaw rate occurs. The y masses 2y, which have their primary motion in the x direction, are moved out of the x-y plane in their secondary motion as a response to a y yaw rate in the z direction. The inner and the outer drive springs 6a and 6b are accordingly designed in such a way that they permit the primary motion as well as the secondary motion of the y mass 2y due to their smaller spring constant in these directions. The secondary motion may once again be detected using plate capacitors, the same as for the x masses 2x. Analogously to the behavior of the y masses, the motion state of the x masses 2x does not change when a y yaw rate occurs, and instead is completed in the x-y plane unchanged.

Figure 5:
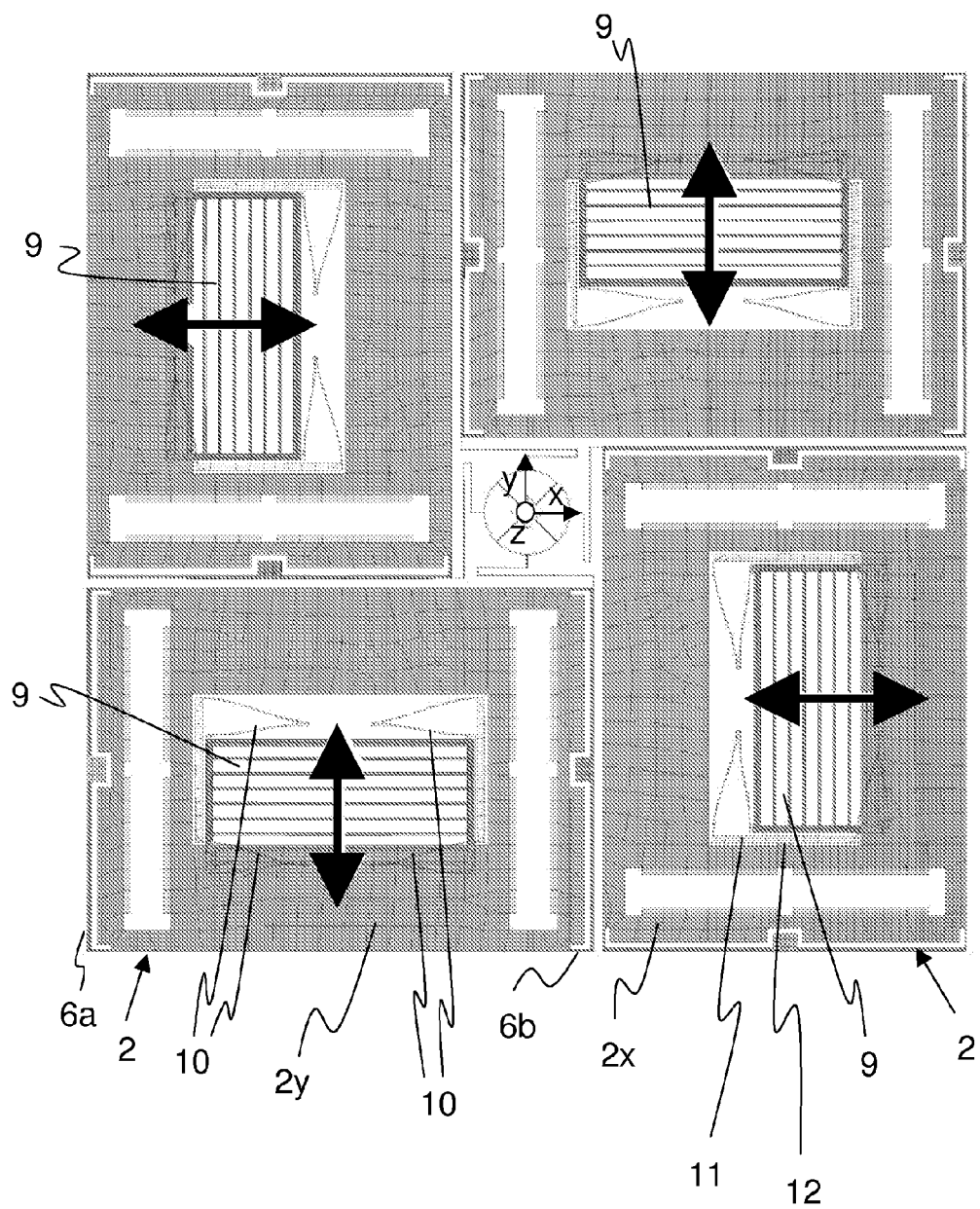
FIG. 5 shows the detection of a z yaw rate of the gyroscope according to FIG. 1.

FIG. 5 illustrates the detection of a z yaw rate of the gyroscope. Whereas the z masses 9 are moved in an essentially fixed manner with their associated x masses 2x or y masses 2y during the detection of an x yaw rate and/or a y yaw rate and in the primary motion, they undergo an independent motion when a z yaw rate occurs. On account of their connecting springs 10, the z masses 9 are able to yield within the x-y plane, at right angles to the drive direction, when a corresponding Coriolis force occurs due to a yaw rate about the z axis. The z mass 9 moves within a cutout in the x mass 2x or the y mass 2y. The apparent overlapping of the z masses 9 with the x masses 2x or y masses 2y in FIG. 5 is an artifact of the simulation program used to create the image, which illustrates the computed deflections in an exaggerated manner for improved visibility. Of course, this does not actually occur, since the z masses 9 are located in the same plane as the x masses 2x and the y masses 2y. The secondary motion of the z mass 9 is detected by vertical plate electrodes or by comb electrodes. The distance of the grid structure of the z mass 9 from elements of the sensor element which are stationarily mounted on the substrate is capacitively determined and converted to a corresponding electrical signal.

The individual yaw rates of the microgyroscope according to the invention are unambiguously determinable as a result of the unique association of specific components with rotations about the respective axis. The x masses 2x, y masses 2y, and z masses 9 have secondary motions which are independent of one another. The corresponding yaw rate may thus be unambiguously determined, and measured using electrical signals from corresponding sensor elements.

Figure 6:
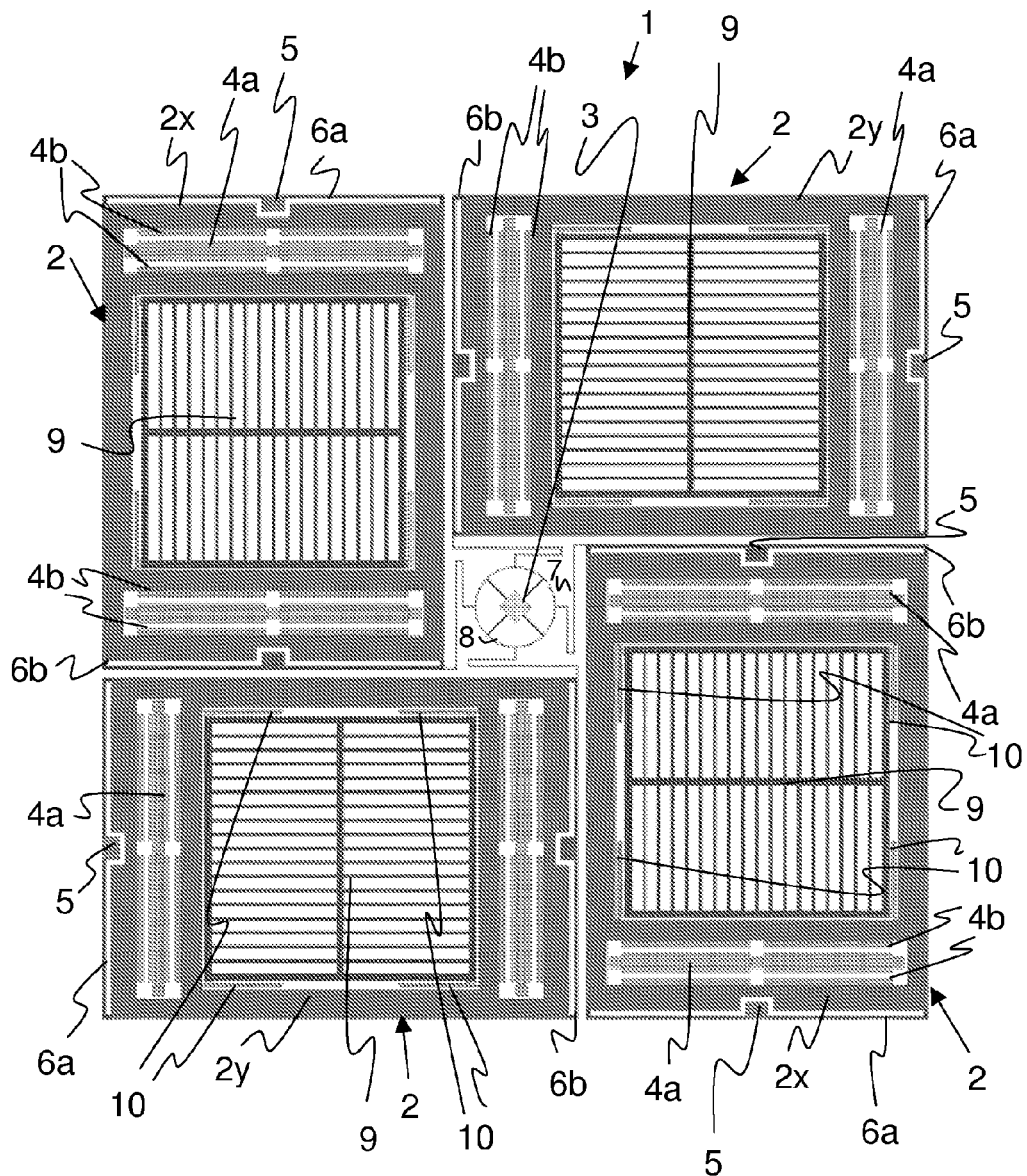
FIG. 6 shows a top view of a z microgyroscope according to the invention.

FIG. 6, in another example of a gyroscope according to the invention, shows a top view of a z microgyroscope. Reference is made to the analogous design from FIG. 1. To avoid repetition, essentially only the differences are described below.

To allow a z yaw rate to be detected with accuracy and sensitivity, compared to the three-dimensional gyroscope the z mass 9 is larger in relation to the x or y mass 2x, 2y which accommodates it. The x masses and the y masses 2x, 2y do not respond to x or y yaw rates by undergoing deflection, and their mass therefore cannot be reduced. The connecting springs 10 are situated directly on the x or y mass 2x, 2y. A bar 11 and a bar projection 12 may be provided, but are not required, since warping due to distortion of the x or y mass 2x, 2y is not expected since there are no deflections in the z direction. The outer and the inner drive springs 6a, 6b, the same as for the three-dimensional gyroscope, have controlled flexibility in the drive direction within the x-y plane. However, they are stiff with regard to a deflection of the x or y mass 2x, 2y in the z direction. Accordingly, in addition to an altered spring cross section, the arrangement of the drive springs 6a, 6b on the x or y mass 2x, 2y is more direct. In addition, the x or y mass 2x, 2y does not represent a sensor plate which cooperates with sensor plates on the substrate 1, since a deflection in the z direction does not occur.

Figure 7:
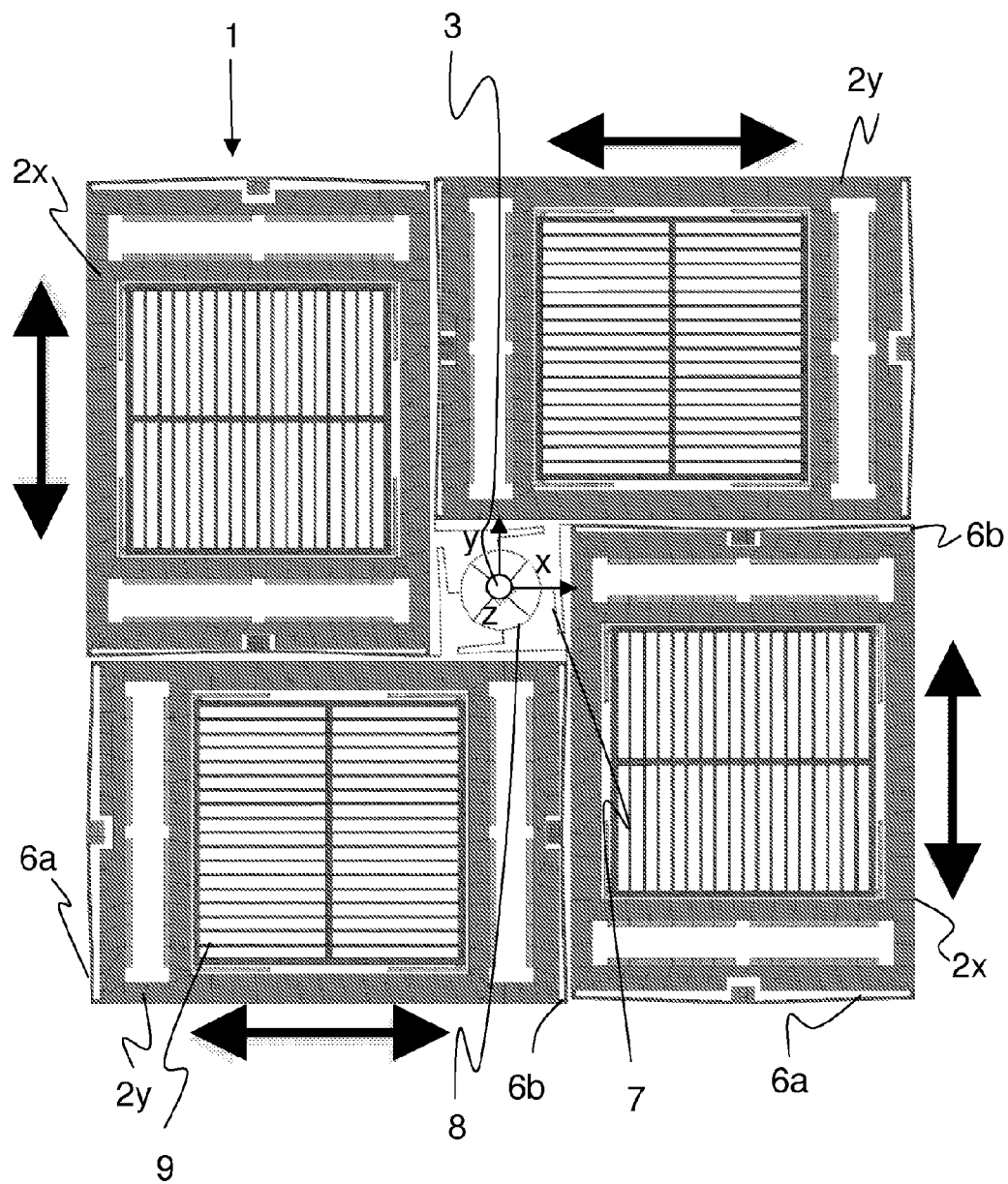
FIG. 7 shows the primary motion of the microgyroscope according to FIG. 6.

FIG. 7 shows the primary motion of the z microgyroscope according to FIG. 6. The same as in FIG. 2 and its associated description, the x masses 2x are driven in the y direction, and the y masses 2y are driven in the x direction, in an oscillating manner.

Figure 8:
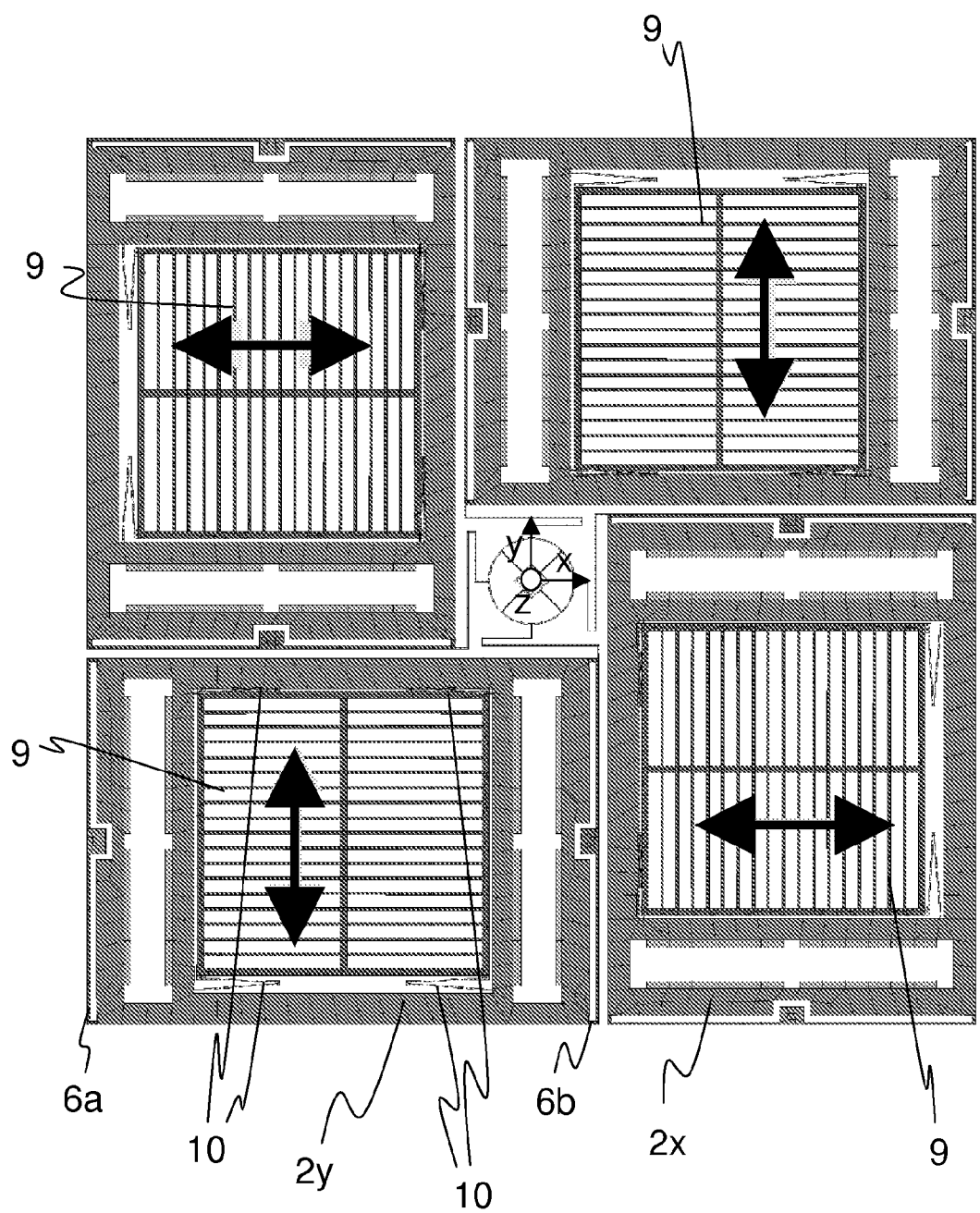
FIG. 8 shows the detection of a z yaw rate of the gyroscope according to FIG. 6.

FIG. 8 illustrates the detection of a z yaw rate of the z gyroscope according to FIG. 6. This is analogous to FIG. 5 and the associated description of the operating principle. The z masses 9 are deflected in the x or the y direction when a Coriolis force occurs due to a z rotation of the substrate 1. When a yaw rate about the z axis is present, forces which are directly radially inwardly/outwardly act on the z masses 9, as also illustrated in FIG. 5. These z masses 9 are then forced into the motion form of the detection mode. Vertical surfaces of the recesses in the z masses 9 form the moving halves of plate capacitors, whose stationary halves are located within the recesses and are not illustrated.

The same as for the three-dimensional gyroscope, external impacts deflect the drive frames or detection frames in such a way that the changes in capacitance at the plate capacitors situated in and around the detection frames cancel out one another. External shocks to the detection electronics system are thus reliably prevented from indicating an erroneous yaw rate signal.

Figure 9:
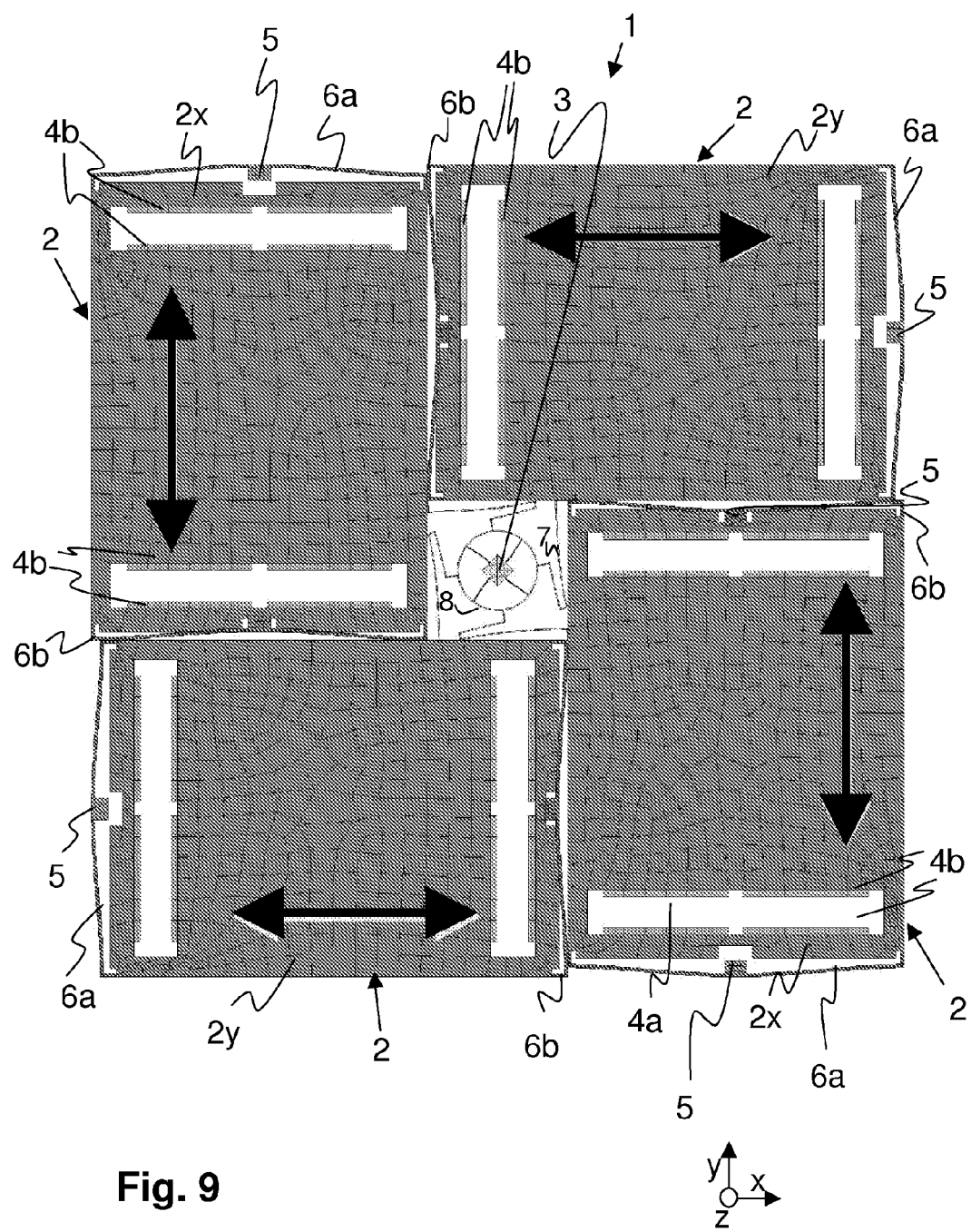
FIG. 9 shows a top view of the primary motion of an x-y microgyroscope according to the invention.

FIG. 9 illustrates a top view of the primary motion of a two-dimensional x-y microgyroscope according to the invention. The gyroscope essentially corresponds to the gyroscope in FIGS. 1 through 4. The only difference is that the present x-y gyroscope has no z mass 9 together with its connecting springs 10, bar 11, and bar projection 12. Therefore, full reference is made to the description for FIGS. 1 through 4, except for the description of the z mass and the corresponding detection of a z yaw rate. The primary motion of the x masses 2x and of the y masses 2y once again occurs in a tangential direction around the central anchoring 3. The x masses 2x and the y masses 2y are connected to one another via a coupling spring 7 and a central spring 8 for synchronization of their motions, and are connected to the central anchoring 3 for retention on the substrate. The x masses 2x and the y masses 2y are driven in an oscillating manner, rotating in the same direction.

Figure 10:
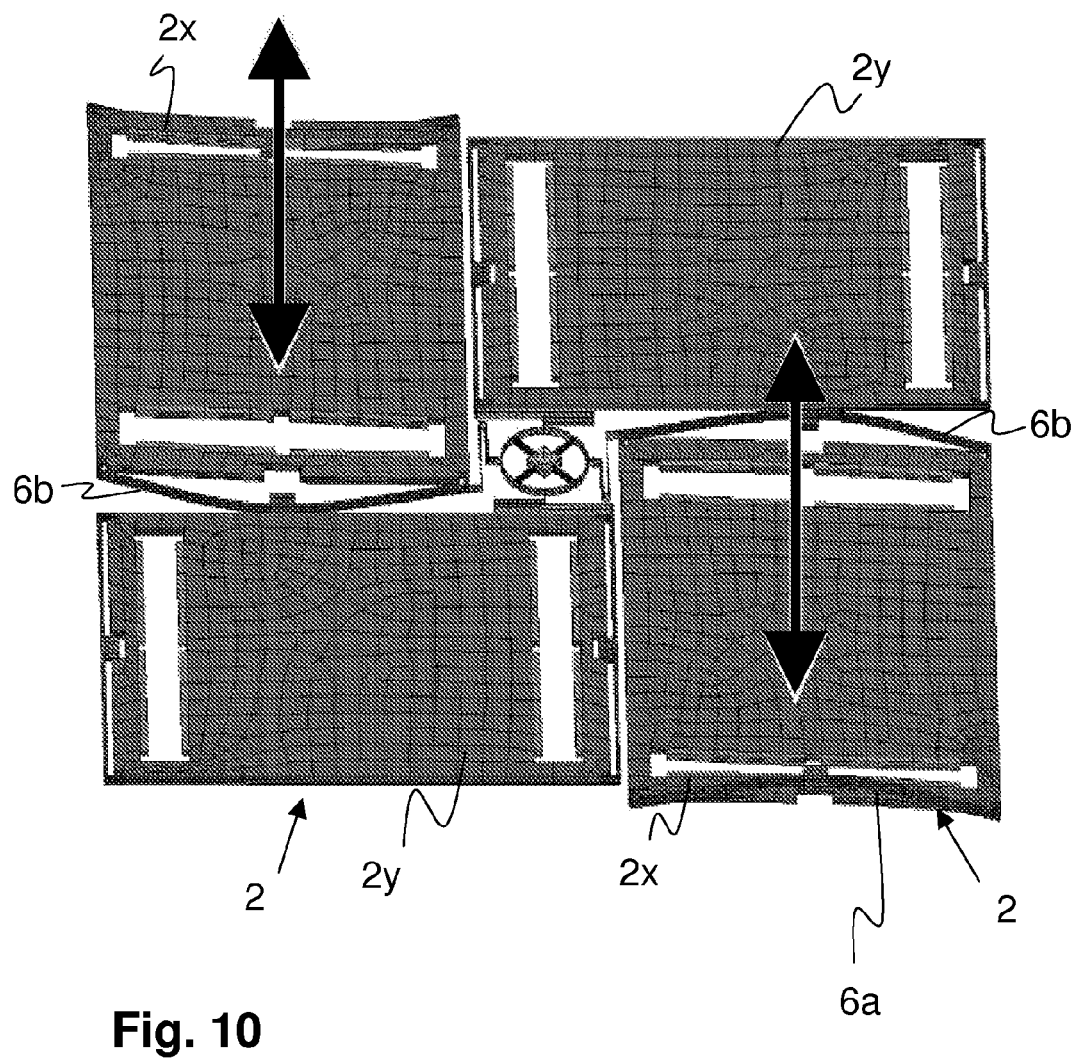
FIG. 10 shows the microgyroscope according to FIG. 9 with the detection of an x yaw rate.

FIG. 10 shows the microgyroscope according to FIG. 9 for the detection of an x yaw rate. The x masses 2x are deflected out of their x-y plane due to a Coriolis force in the z direction. The x masses 2x move essentially parallel to their drive position along the z axis. The resulting change in the distance of the x masses 2x from the substrate is detected by corresponding sensor plates located on the bottom side of the x masses 2x and on the top side of the substrate.

Figure 11:
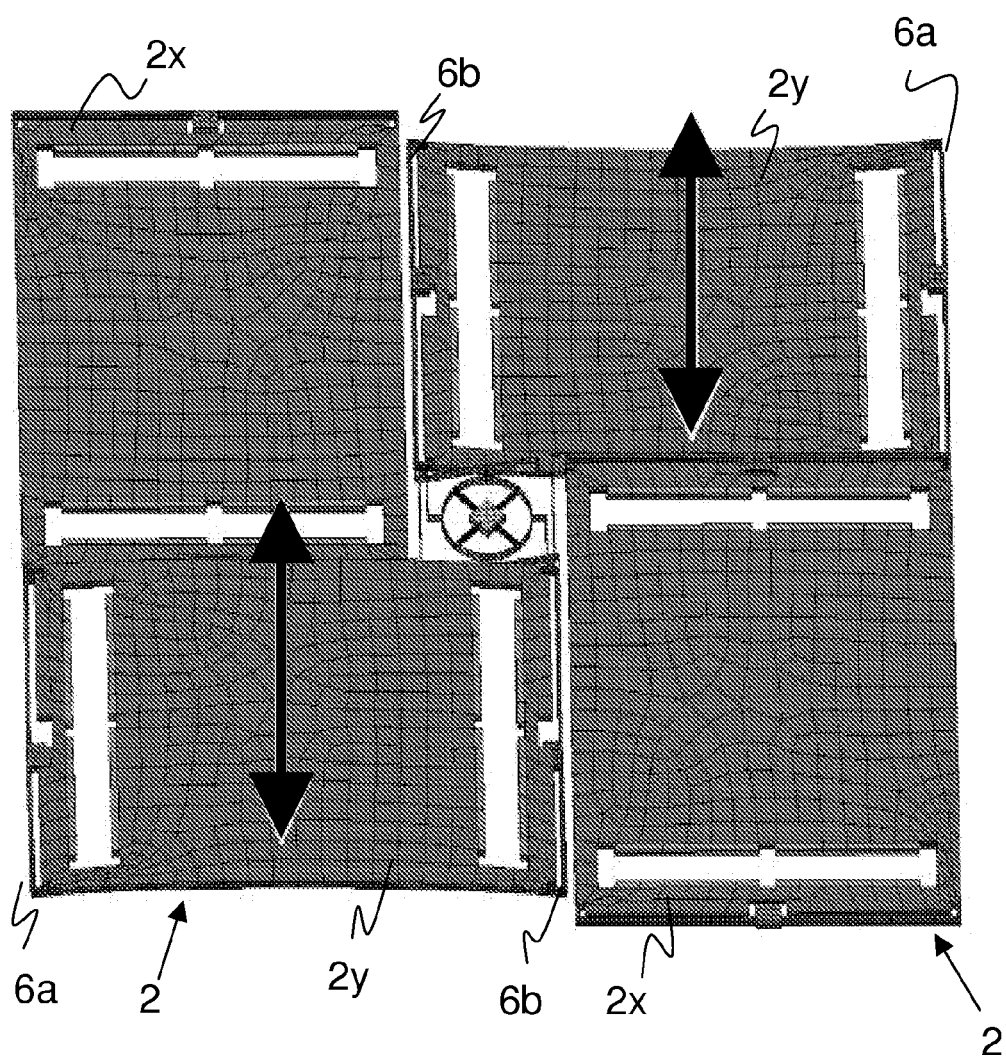
FIG. 11 shows the microgyroscope according to FIG. 9 with the detection of a y yaw rate.

FIG. 11, analogously to FIG. 10, shows the microgyroscope according to FIG. 9 for the detection of a y yaw rate. Instead of the x masses 2x, in the present case the y masses 2y are deflected from their drive plane in the z direction.

The present invention is not limited to the exemplary embodiments illustrated. Thus, other shapes and other arrangements of the individual components within the scope of the claims are always possible. In particular, for a design as a three-dimensional gyroscope, it is possible for only one of the three yaw rates, for example the z yaw rate, to be evaluated. In addition, use of the gyroscope strictly as a z gyroscope is possible. Likewise, for a three-dimensional gyroscope the arrangement of the sensor plates beneath the x or y mass and on the substrate may be dispensed with in order to obtain a z gyroscope. In that case, sensor elements are associated only with the z masses. However, the embodiment of the strictly z gyroscope illustrated in the figures is more advantageous, since more cost-effective manufacture and more accurate measurement is thus possible.

LIST OF REFERENCE NUMERALS

1 Substrate
2 Sensor plate
2x x mass
2y y mass
3 Central anchoring
4a Stationary comb sections
4b Movable comb sections
5 Fixing anchors
6a Outer drive spring
6b Inner drive spring
7 Coupling spring
8 Central spring
9 z mass
10 Connecting spring
11 Bar
12 Central bar projection

What is claimed is:

1. A microgyroscope for determining rotational motions about at least one of three perpendicular spatial axes x, y, and z, comprising:

a substrate on which a plurality of masses are situated, the plurality of masses oscillating in parallel to a plane of the substrate in an x-y plane, a subset of oscillating masses in the plurality of masses being attached to the substrate by springs and anchoring; drive elements for maintaining the oscillating vibrations for the plurality of masses which are subjected to Coriolis force when the substrate rotates about one of the three perpendicular spatial axes x, y, and z;

sensor elements for detecting at least one deflection of the plurality of masses due to the Coriolis force; wherein a central anchoring is situated on the substrate, and the plurality of masses are arranged around the central anchoring;

wherein the subset of oscillating masses further comprises at least one mass selected from x masses and y masses, the x masses being deflectable along the z axis perpendicular to the substrate to detect yaw rates about the x axis, the y masses being also deflectable along the z axis perpendicular to the substrate to detect yaw rates about the y axis; wherein the plurality of masses further comprises z masses that, within the x-y plane, are deflectable in a direction that is perpendicular to a drive direction to detect yaw rates about the z axis;

wherein the x and y masses are coupled to the central anchoring, and the z masses are coupled to at least one of the x masses and y masses; and wherein the x and y masses are supported on the substrate and configured to be linearly and tangentially driven about the central anchoring.

2. The microgyroscope according to claim 1, wherein the x and y masses are sensor plates.

3. The microgyroscope according to claim 1, wherein the z masses are frames.

4. The microgyroscope according to claim 1, wherein the x, y, and z masses have a rectangular layout.

5. The microgyroscope according to claim 1, wherein the x masses and the y masses are mounted on the substrate via fixing anchors and drive springs.

6. The microgyroscope according to claim 5, wherein the drive springs of the x masses have controllable flexibility in the y and z directions, but are substantially inflexible in the x direction, when the microgyroscope is to detect the yaw rates about the x axis.

7. The microgyroscope according to claim 5, wherein the drive springs of the x masses have controllable flexibility in the y direction, and are substantially inflexible in the z and x directions, when the microgyroscope is to detect the yaw rates about the x axis.

8. The microgyroscope according to claim 5, wherein the drive springs of the y masses have controllable flexibility in the x direction, and are substantially inflexible in the y and z directions, when the microgyroscope is to detect no yaw rates about the y axis.

9. The microgyroscope according to claim 5, wherein the drive springs of the y masses have controllable flexibility in the x and z directions, but are substantially inflexible in the y direction, when the microgyroscope is to detect no yaw rates about the y axis.

10. The microgyroscope according to claim 5, wherein each of the x masses and the y masses is retained by an outer drive spring and an inner drive spring, wherein the fixing anchor is situated between the outer and the inner drive springs.

11. The microgyroscope according to claim 10, wherein each respective outer and inner drive spring is situated on the corresponding mass with controllable flexibility in the z direction when the microgyro scope is to detect the yaw rate about an axis selected from the x and y axes, wherein the fixing anchor is situated between the outer and the inner drive springs.

12. The microgyroscope according to claim 10, wherein each respective outer and inner drive spring is situated on the corresponding mass so as to be substantially inflexible in the z direction when the microgyroscope is to detect only the yaw rate around the z axis.

13. The microgyroscope according to claim 11, wherein the outer and inner drive springs have different lengths.

14. The microgyroscope according to claim 1, wherein the x masses and the y masses are driven by comb electrodes.

15. The microgyroscope according to claim 1, wherein the x masses are oriented and driven in the y direction, and the y masses are oriented and driven in the x direction.

16. The microgyroscope according to claim 1, wherein in each case two x masses and two y masses are arranged in alternation around the central anchoring.

17. The microgyroscope according to claim 1, wherein each of the x masses and the y masses is situated on a central spring by means of a coupling spring.

18. The microgyroscope according to claim 17, wherein the central spring is attached to the central anchoring and is designed to rotate around same in the x-y plane.

19. The microgyroscope according to claim 1, wherein the coupling spring has a spiral design, and is stiff in a tangential direction to transmit coupling forces in this direction and soft in the radial direction to avoid distortion forces on the x and y masses.

20. The microgyroscope according to claim 1, wherein one of the z masses is situated on each of the x and y masses.

21. The microgyroscope according to claim 1, wherein one of the z masses is situated on each of the x and y masses by means of connecting springs.

22. The microgyroscope according to claim 21, wherein the connecting springs are situated on a bar which is fastened substantially centrally to each of the x and y masses by a bar projection.

23. The microgyroscope according to claim 22 wherein the bar projection and the fixing anchor of each of the x and y masses are in flush alignment with one another.

24. The microgyroscope according to claim 21, wherein the connecting springs associated with the x masses have controllable flexibility in the x direction, and are substantially inflexible in the y and z directions.

25. The microgyroscope according to claim 21, wherein the connecting springs associated with the y masses have controllable flexibility in the y direction, and are substantially inflexible in the x and z directions.

26. The microgyroscope according to claim 21, wherein the microgyroscope is designed as a z gyroscope in order to detect only the yaw rates around the z axis, the drive springs of the x masses being designed in such a way that they have controllable flexibility in the y direction, and are substantially inflexible in the z and x directions, the drive springs of the y masses being designed in such a way that they have controllable flexibility in the x direction, and are substantially inflexible in the y and z directions, the connecting springs associated with the x masses having controllable flexibility in the x direction and being substantially inflexible in the y and z directions, and the connecting springs associated with the y masses having controllable flexibility in the y direction and being substantially inflexible in the x and z directions.

27. The microgyroscope according to claim 6, wherein the microgyroscope is designed as a two-dimensional gyroscope in order to detect the yaw rates about the x and y axes, the drive springs of the x masses being designed in such a way that they have controllable flexibility in the y and z directions, but are substantially inflexible in the x direction, the drive springs of the y masses being designed in such a way that they have controllable flexibility in the x and z directions, but are substantially inflexible in the y direction, and the gyroscope having no z masses.

28. The microgyroscope according to claim 21, wherein the microgyroscope is designed as a three-dimensional gyroscope in order to detect the yaw rates about the x, y, and z axes, the drive springs of the x masses being designed in such a way that they have controllable flexibility in the y and z directions, but are substantially inflexible in the x direction, the drive springs of the y masses being designed in such a way that they have controllable flexibility in the x and z directions, but are substantially inflexible in the y direction, the connecting springs of the z masses associated with the x masses having controllable flexibility in the x direction, and are substantially inflexible in the y and z directions, and the connecting springs of the z masses associated with the y masses having controllable flexibility in the y direction, and are substantially inflexible in the x and z directions.

* * * * *